US010097230B2

(12) United States Patent
Fattinger (10) Patent No.: US 10,097,230 B2
(45) Date of Patent: Oct. 9, 2018

(54) SYSTEMS AND METHODS FOR CANCELLATION OF LEAKAGE INTO A RX PORT OF A DUPLEXER OR MULTIPLEXER (71) Applicant: TriQuint Semiconductor, Inc., Hillsboro, OR (US)

(72) Inventor: Gernot Fattinger, Sorrento, FL (US)

(73) Assignee: Qorvo US, Inc., Greensboro, NC (US)

( * ) Notice: Subject to any disclaimer, the term of this patent is extended or adjusted under 35 U.S.C. 154(b) by 137 days.

(21) Appl. No.: 15/139,775

(22) Filed: Apr. 27, 2016

(65) Prior Publication Data

US 2017/0163308 A1 Jun. 8, 2017

Related U.S. Application Data (60) Provisional application No. 62/264,649, filed on Dec. 8, 2015.

(51) Int. Cl.
*H04L 5/14* (2006.01)
*H04B 1/44* (2006.01)

(52) U.S. Cl.
CPC ........ *H04B 1/44* (2013.01); *H04L 5/14* (2013.01)

(58) Field of Classification Search
CPC .............. H04B 1/04; H04B 17/00; H04L 5/14
See application file for complete search history.

(56) References Cited

U.S. PATENT DOCUMENTS

| 9,252,831 | B2* | 2/2016 | Rimini | H04B 1/525 |
| 9,479,214 | B2* | 10/2016 | Webb | H04B 1/525 |
| 9,698,861 | B2* | 7/2017 | Braithwaite | H04B 1/525 |
| 2005/0159128 | A1* | 7/2005 | Collins | H04B 7/18513 |
| | | | | 455/284 |
| 2007/0298838 | A1* | 12/2007 | Meiyappan | H04B 1/0057 |
| | | | | 455/553.1 |
| 2009/0233568 | A1* | 9/2009 | Zhang | H04B 1/525 |
| | | | | 455/296 |
| 2010/0074240 | A1* | 3/2010 | Jian | H04B 1/0057 |
| | | | | 370/339 |
| 2015/0108210 | A1* | 4/2015 | Zhou | H03H 7/18 |
| | | | | 235/375 |
| 2016/0043465 | A1* | 2/2016 | McDevitt | H01Q 3/267 |
| | | | | 342/368 |
| 2016/0094331 | A1* | 3/2016 | White | H04B 1/525 |
| | | | | 370/278 |
| 2016/0126932 | A1* | 5/2016 | Nakai | H03H 9/02755 |
| | | | | 370/277 |

* cited by examiner

Primary Examiner — Ricky Q Ngo
Assistant Examiner — Lan-Huong Truong
(74) Attorney, Agent, or Firm — Withrow & Terranova, P.L.L.C.

(57) ABSTRACT

Systems and methods relating to improving transmit (TX) port to receive (RX) port isolation of a duplexer or multiplexer are disclosed. In some embodiments, a system includes a duplexer or multiplexer having a transmit port, a receive port, and an antenna port. The system further includes a leakage cancellation subsystem adapted to cancel a leakage signal from the TX port of the duplexer or multiplexer to the RX port of the duplexer or multiplexer across a desired cancellation bandwidth. The leakage cancellation subsystem compensates for variation of the leakage signal across the desired cancellation bandwidth, thereby improving TX port to RX port isolation over conventional systems.

20 Claims, 11 Drawing Sheets

SYSTEMS AND METHODS FOR CANCELLATION OF LEAKAGE INTO A RX PORT OF A DUPLEXER OR MULTIPLEXER

RELATED APPLICATIONS

This application claims the benefit of provisional patent application Ser. No. 62/264,649, filed Dec. 8, 2015, the disclosure of which is hereby incorporated herein by reference in its entirety.

FIELD OF THE DISCLOSURE

The present disclosure relates to duplexers and multiplexers and, in particular, to improving transmit (TX) to receive (RX) port isolation of a duplexer or multiplexer.

BACKGROUND

Duplexers (also referred to herein as duplex filters) and multiplexers (also referred to herein as multiplex filters) in modern communications systems require high out-of-band rejection and high isolation from any transmit (TX) to any receive (RX) port. The straightforward way to improve these rejection and isolation requirements is by means of re-optimization of the parameters governing the individual resonator elements in a filter or by increasing the order of the filter topology. Unfortunately, these methods more often than not result in an accompanying increase in in-band insertion loss.

As such, there is a need for systems and methods for improving out-of-band rejection and isolation between TX and RX ports of a duplexer or multiplexer while not impacting in-band insertion loss.

SUMMARY

Systems and methods relating to improving transmit (TX) port to receive (RX) port isolation of a duplexer or multiplexer are disclosed. In some embodiments, a system includes a duplexer or multiplexer having a TX port, a RX port, and an antenna port. The system further includes a leakage cancellation subsystem adapted to cancel a leakage signal from the TX port of the duplexer or multiplexer to the RX port of the duplexer or multiplexer across a desired cancellation bandwidth. The leakage cancellation subsystem compensates for variation of the leakage signal across the desired cancellation bandwidth, thereby improving TX port to RX port isolation over conventional systems.

In some embodiments, the desired cancellation bandwidth is a RX band of a RX filter of the duplexer or multiplexer that couples the antenna port to the RX port. In other embodiments, the desired cancellation bandwidth is a TX band of a TX filter of the duplexer or multiplexer that couples the TX port to the antenna port.

In some embodiments, the variation of the leakage signal across the desired cancellation bandwidth is a variation of both an amplitude and a phase of the leakage signal over the desired cancellation bandwidth.

In some embodiments, the leakage cancellation subsystem includes filtering circuitry having an input coupled to the TX port of the duplexer or multiplexer. The filtering circuitry is adapted to filter a TX signal provided to the TX port of the duplexer or multiplexer to generate a cancellation signal that is a function of (e.g., mimics) an amplitude variation of the leakage signal across the desired cancellation bandwidth and a phase variation of the leakage signal across the desired cancellation bandwidth. In some embodiments, the filtering circuitry includes acoustic elements. In some embodiments, the filtering circuitry includes a Bulk Acoustic Wave (BAW) filter. In other embodiments, the filtering circuitry includes a Surface Acoustic Wave (SAW) filter.

In some embodiments, the leakage cancellation subsystem further includes attenuation and phase adjustment circuitry having an input coupled to an output of the filtering circuitry and an output coupled to the RX port of the duplexer or multiplexer. The attenuation and phase adjustment circuitry is adapted to apply an amplitude offset and a phase offset to the cancellation signal to thereby provide an adjusted cancellation signal that mitigates the leakage signal at the RX port of the duplexer or multiplexer.

In some embodiments, the leakage cancellation subsystem includes filtering circuitry and attenuation and phase adjustment circuitry. The filtering circuitry has an input coupled to the TX port of the duplexer or multiplexer. The filtering circuitry includes acoustic elements and is adapted to filter a TX signal provided to the TX port of the duplexer or multiplexer to generate a cancellation signal that is a function of (e.g., mimics) an amplitude variation of the leakage signal across the desired cancellation bandwidth and a phase variation of the leakage signal across the desired cancellation bandwidth. The attenuation and phase adjustment circuitry has an input coupled to an output of the filtering circuitry and an output coupled to the RX port of the duplexer or multiplexer. The attenuation and phase adjustment circuitry is adapted to apply an amplitude offset and a phase offset to the cancellation signal to thereby provide an adjusted cancellation signal that mitigates the leakage signal at the RX port of the duplexer or multiplexer. In some embodiments, the filtering circuitry includes a BAW filter. In other embodiments, the filtering circuitry includes a SAW filter.

In some embodiments, the duplexer or multiplexer includes a TX filter that couples the TX port to the antenna port and a RX filter that couples the antenna port to the RX port, the desired cancellation bandwidth is a RX band of the RX filter of the duplexer or multiplexer, and the system further includes a second leakage cancellation subsystem adapted to cancel a leakage signal from the TX port of the duplexer or multiplexer to the RX port of the duplexer or multiplexer across a TX band of the TX filter of the duplexer or multiplexer. The second leakage cancellation subsystem compensates for variation of the leakage signal across the TX band. In some embodiments, the duplexer or multiplexer is a duplexer.

In some embodiments, the duplexer or multiplexer is a multiplexer having the TX port, a second TX port, and the RX port. The multiplexer includes a first TX filter that couples the TX port to the antenna port, a second TX filter that couples the second TX port to the antenna port, and a RX filter that couples the antenna port to the RX port. The desired cancellation bandwidth is a RX band of the RX filter of the multiplexer. The system further includes a second leakage cancellation subsystem adapted to cancel a leakage signal from the second TX port of the multiplexer to the RX port of the multiplexer across a TX band of the second TX filter of the multiplexer. The second leakage cancellation subsystem compensates for variation of the leakage signal across the TX band of the second TX filter.

In some embodiments, the duplexer or multiplexer is a multiplexer having the TX port, a second TX port, and the RX port. The multiplexer includes a first TX filter that couples the TX port to the antenna port, a second TX filter that couples the second TX port to the antenna port, and a RX filter that couples the antenna port to the RX port. The desired cancellation bandwidth is a RX band of the RX filter of the multiplexer. The system further includes a second leakage cancellation subsystem including attenuation and phase adjustment circuitry having an input coupled to the second TX port and an output coupled to the RX port. In some embodiments, the attenuation and phase adjustment circuitry is adapted to apply an amplitude offset and a phase offset to a TX signal provided to the second TX port of the multiplexer to thereby provide a cancellation signal that mitigates a leakage signal from the second TX port to the RX port of the multiplexer.

In some embodiments, the duplexer or multiplexer is a duplexer. In other embodiments, the duplexer or multiplexer is a multiplexer.

Embodiments of a method of mitigating a leakage signal from a TX port to a RX port of a duplexer or multiplexer are also disclosed. In some embodiments, the method includes generating a cancellation signal that is a function of (e.g., mimics) an amplitude variation and a phase variation of a leakage signal from a TX port to a RX port of a duplexer or multiplexer across a desired cancellation bandwidth, applying an amplitude offset and a phase offset to the cancellation signal to provide an adjusted cancellation signal, and applying the adjusted cancellation signal to a RX signal output at the RX port of the duplexer or multiplexer to thereby mitigate the leakage signal.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It should also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having meanings that are consistent with their meanings in the context of this specification and the relevant art and will not be interpreted in an idealized or overly formal sense unless expressly so defined herein.

Duplexers and multiplexers in modern communications systems require high out-of-band rejection and high isolation from any transmit (TX) port to any receive (RX) port. The straightforward way to improve these rejection and isolation requirements is by means of re-optimization of the parameters governing the individual resonator elements in a filter or by increasing the order of the filter topology. Unfortunately, these methods more often than not result in an accompanying increase in in-band insertion loss. Another approach is to use feedback circuits that attenuate signals leaking from, for example, the TX port into the RX path; however, these circuits usually provide a narrowband cancellation behavior that does not encompass the respective full operating bands. The present disclosure aims to circumvent this effect.

Figure 1:
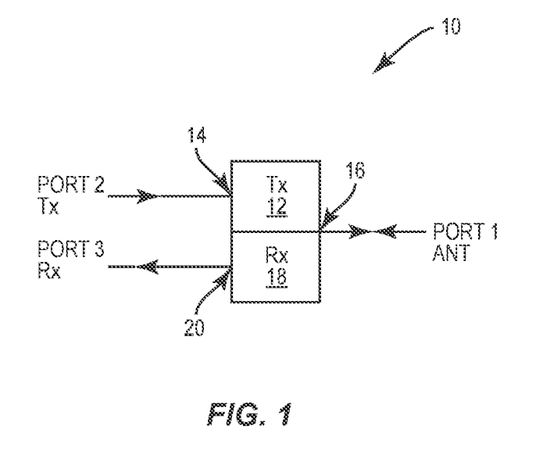
FIG. 1 illustrates a duplexer.

Before describing embodiments of the present disclosure, a discussion of a conventional duplexer/multiplexer and a conventional approach to cancelling the leakage signal from a TX port to a RX port of the duplexer/multiplexer is beneficial. In this regard, FIG. 1 illustrates a duplexer 10 that includes a TX filter 12 that couples a TX port 14 of the duplexer 10 to an antenna port 16 of the duplexer 10 and a RX filter 18 that couples the antenna port 16 of the duplexer 10 to a RX port 20 of the duplexer 10. A multiplexer has a similar architecture, but has, e.g., multiple TX filters each corresponding to a separate TX port and/or multiple RX filters each corresponding to a separate RX port. Since the duplexer 10 does not have perfect isolation between the TX port 14 and the RX port 20 (which is referred to as TX/RX isolation), during operation when a TX signal is provided to the TX port 14, a resulting leakage signal passes from the TX port 14 to the RX port 20. The ability of the duplexer 10 to prevent or attenuate this leakage signal is referred to as the TX/RX isolation of the duplexer 10.

Figure 2:
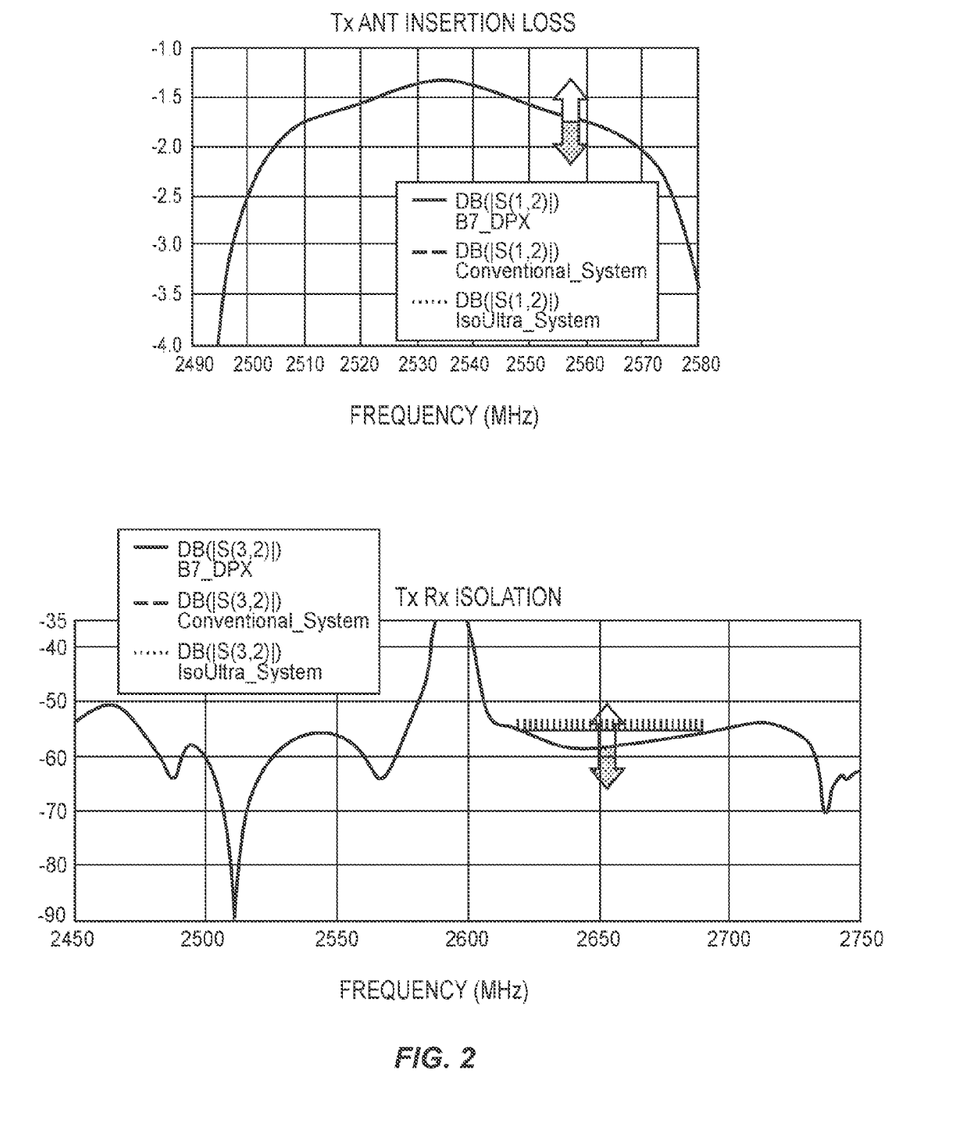
FIG. 2 illustrates simulation results illustrating insertion loss over a desired transmit (TX) band and TX port to receive (RX) port isolation for one example implementation of the duplexer of FIG. 1.

A conventional duplexer/multiplexer, such as the duplexer 10 of FIG. 1, requires a trade-off between insertion loss and attenuation/isolation. Using FIG. 1 as an example, insertion loss refers to the attention of the TX signal when passing from the TX port 14 to the antenna port 16 through the TX filter 12 of the duplexer 10. Everything else being the same, better (higher) TX/RX isolation results in higher insertion loss, and vice versa, better (lower) insertion loss results in worse (lower) TX/RX isolation. For example, FIG. 2 illustrates simulation results for one example implementation of the duplexer 10 of FIG. 1. The top graph of FIG. 2 illustrates insertion loss over the desired TX frequency band. The bottom graph of FIG. 2 illustrates TX/RX isolation over both the TX band (the frequency band centered at 2,535 megahertz (MHz) in this example) and the RX band (the frequency band centered at 2,655 MHz in this example). Increasing the TX/RX isolation in the RX frequency band increases the insertion loss and, conversely, decreasing the insertion loss decreases the TX/RX isolation in the RX frequency band.

Figure 3:
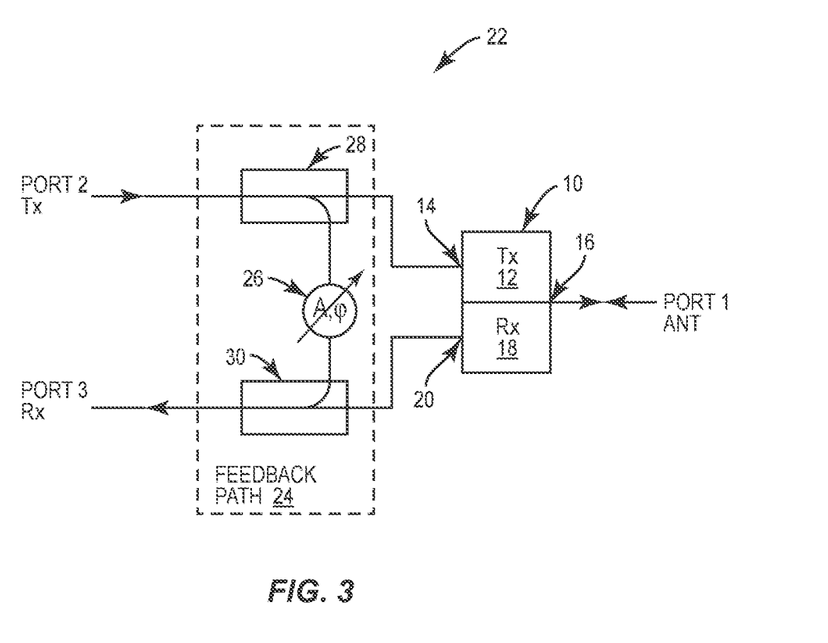
FIG. 3 illustrates a conventional system for improving TX to RX port isolation of the duplexer of FIG. 1.
Figure 4:
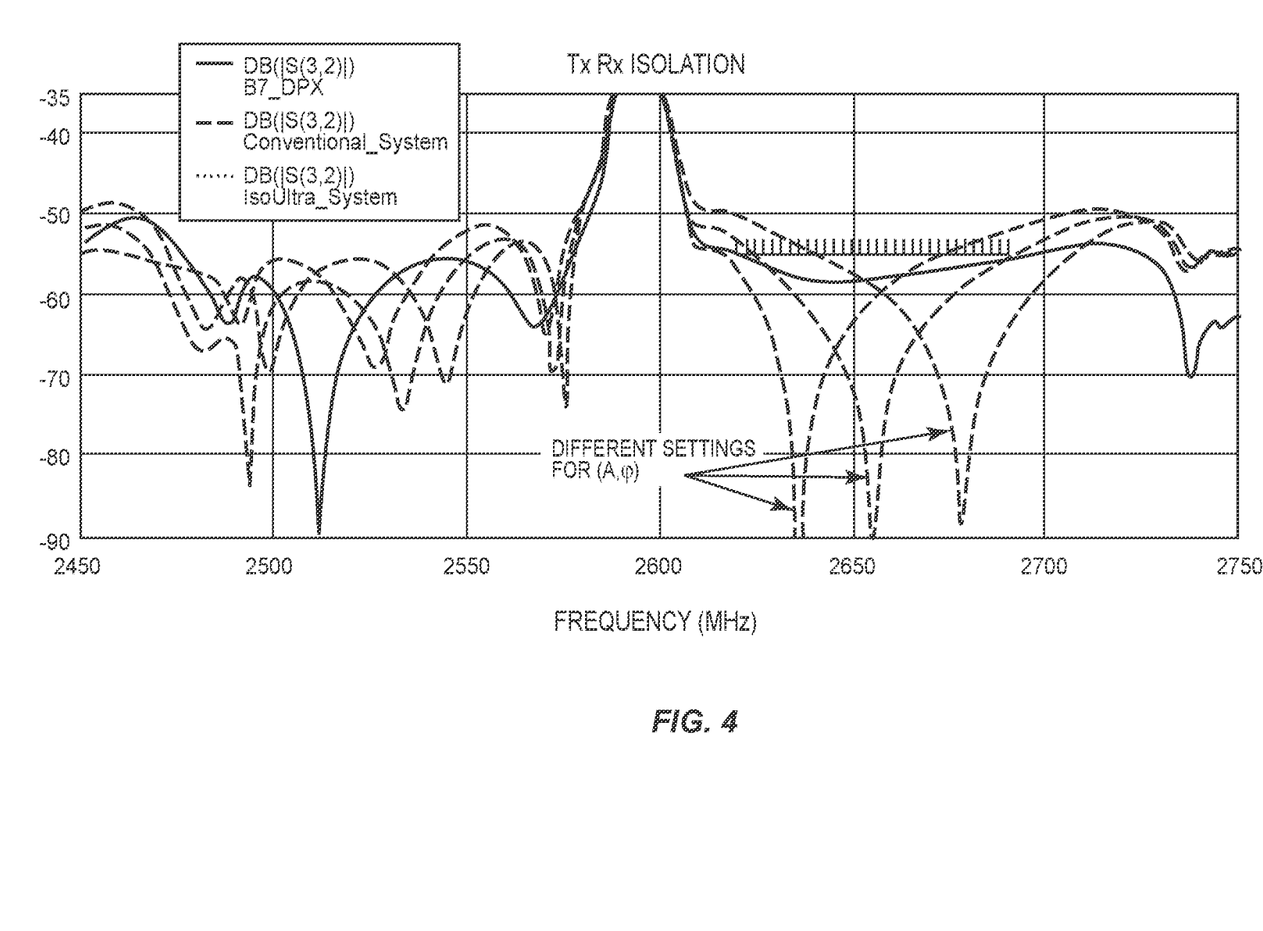
FIG. 4 is a graphical illustration of the narrowband notches in the TX to RX port isolation of the conventional system of FIG. 3.

FIG. 3 illustrates a conventional system 22 improving the TX/RX isolation of the duplexer 10 of FIG. 1. The conventional system 22 includes a feedback path 24 that includes attenuation and phase adjustment circuitry 26 having an input coupled to the TX port 14 via a first coupler 28 and an output coupled to the RX port 20 via a second coupler 30. The approach of the conventional system 22 to improve over a regular duplexer/multiplexer is simply using an attenuated signal from (e.g., directly from) the TX port 14 (or alternatively the antenna port 16, which may be viewed as an attenuated signal indirectly from the TX port 14), which results in narrowband attenuation notches in the isolation. More specifically, the attenuation and phase adjustment circuitry 26 generates a cancellation signal that is 180° out-of-phase with the leakage signal from the TX port 14 to the RX port 20 and having the same amplitude as the leakage signal such that, when the cancellation signal is combined with the RX signal at the second coupler 30, the leakage signal is mitigated within the narrowband attenuation notch in the RX band. The narrowband notches can be tuned to different frequency positions by proper adjustment of an attenuation (A) and phase shift (φ) in the feedback path 24 via the attenuation and phase adjustment circuitry 26. As illustrated in FIG. 4, at a given setting (A, φ), only one notch position is possible with one feedback branch. Further, the isolation in the TX frequency band may be affected by lack of frequency selectivity of the feedback path 24, as illustrated in FIG. 4.

Using the conventional system 22, at any given time, there is only one attenuation (A) adjustment and one phase shift (φ) adjustment (i.e., only one narrowband attenuation notch in the RX band). This may provide satisfactory results if the amplitude and phase of the leakage signal were constant over the RX band (which is the desired cancellation band in this example). However, particularly when using acoustic elements in the TX filter 12 and the RX filter 18 of the duplexer 10, the leakage signal does not exhibit a constant amplitude and phase over the RX band (i.e., the amplitude and phase of the leakage signal vary across the RX band). Specifically, with respect to the leakage signal, the TX signal passes through the TX filter 12 and the RX filter 18 to the RX port 20. The TX filter 12 and the RX filter 18 have their own passbands having their own passband shapes. The shapes of these passbands dictate the shape of the amplitude variation of the amplitude variation across the RX band. The filter design (e.g., number of resonators used, topology of the filter, other elements (inductors and/or capacitors), spurious modes, etc.) defines the phase variation. This phase variation can be simulated with the filter simulation.

Systems and methods are disclosed herein that mitigate a leakage signal from a TX port to a RX port of a duplexer or multiplexer in such a manner as to account to variation of the leakage signal across a desired cancellation bandwidth (e.g., the RX band). This variation of the leakage signal includes an amplitude variation of the leakage signal across the desired cancellation bandwidth and/or a phase variation of the leakage signal across the desired cancellation bandwidth. In some embodiments, a system is provided that includes a duplexer or multiplexer having a TX port, a RX port, and an antenna port, and a leakage cancellation subsystem adapted to cancel a leakage signal from the TX port of the duplexer or multiplexer to the RX port of the duplexer or multiplexer across a desired cancellation bandwidth. The leakage cancellation subsystem compensates for variation of the leakage signal across the desired cancellation bandwidth.

Figure 5:
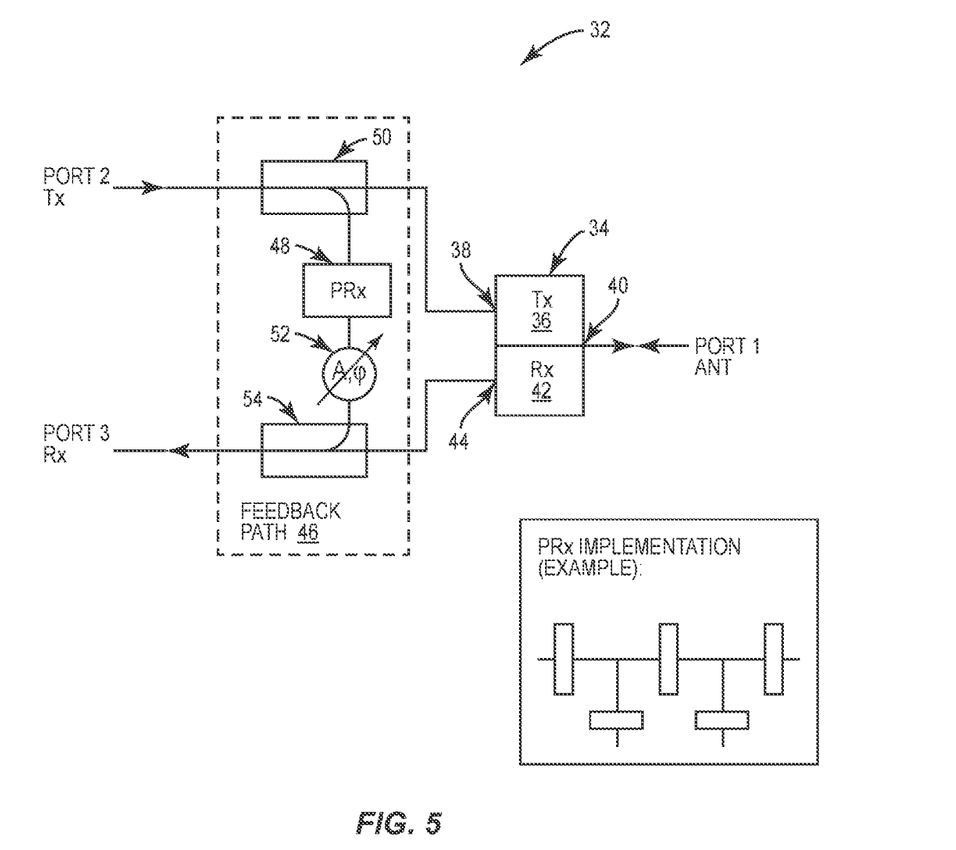
FIG. 5 illustrates a system providing improved TX to RX port isolation by compensating for variation of a leakage signal across a desired cancellation bandwidth according to some embodiments of the present disclosure.

In this regard, FIG. 5 illustrates a system 32 providing improved TX/RX isolation by compensating for variation of a leakage signal across a desired cancellation bandwidth according to some embodiments of the present disclosure. As illustrated, the system 32 includes, in this example, a duplexer 34 that includes a TX filter 36 that couples a TX port 38 of the duplexer 34 to an antenna port 40 of the duplexer 34 and a RX filter 42 that couples the antenna port 40 of the duplexer 34 to a RX port 44 of the duplexer 34. The system 32 also includes a feedback path, which is referred to herein as a leakage cancellation subsystem 46, that operates to mitigate, or cancel, a leakage signal that passes from the TX port 38 to the RX port 44 of the duplexer 34 in such a manner as to compensate for, or account for, variation of the leakage signal (e.g., variation of amplitude and/or phase of the leakage signal) across a desired cancellation bandwidth. In this example, the desired cancellation bandwidth is the RX band (i.e., the passband of the RX filter 42).

More specifically, the leakage cancellation subsystem 46 includes a Parallel RX (PRx) filter 48, which is also referred to herein as a PRx element, having an input coupled to the TX port 38 of the duplexer 34 via a coupler 50. Note that while, in this example, the PRx filter 48 is directly coupled to the TX port 38 via the coupler 50, the present disclosure is not limited thereto. For example, the PRx filter 48 may alternatively be coupled to the antenna port 40 (in this manner, the PRx filter 48 is indirectly coupled to the TX port 38 via the antenna port 40 and the TX filter 36). Note that the same is true for the other examples of leak cancellation subsystems disclosed herein. In some embodiments, the PRx filter 48 includes one or more acoustic elements (e.g., an acoustic filter such as, for example, a Bulk Acoustic Wave (BAW) filter that includes one or more BAW resonators or a Surface Acoustic Wave (SAW) filter that includes one or more SAW resonators). Acoustic elements can follow a fast phase response across the frequency of the filter elements of the duplexer 34. Note that, in some embodiments, elements (e.g., acoustic elements) of the PRx filter 48 can be implemented on the same die as the duplexer 34 (i.e., a monolithic implementation) or implemented on a separate die.

The PRx filter 48 has a custom-shaped phase response in the feedback path. More specifically, in some embodiments, the PRx filter 48 has an amplitude and phase response that mimics that of the leakage path (i.e., the path through which the leakage signal propagates from the TX port 38 to the RX port 44) across the desired cancellation bandwidth, which again in this example is the RX band but is not limited thereto. In this manner, the PRx filter 48 compensates for the variation of the leakage signal across the desired cancellation bandwidth and, as a result, TX/RX isolation is improved.

The leakage cancellation subsystem 46 also includes attenuation and phase adjustment circuitry 52 having an input coupled to the output of the PRx filter 48 and an output coupled to the RX port 44 of the duplexer 34 via a coupler 54. The leakage cancellation subsystem 46 operates to apply an attenuation, or amplitude offset, (A) and a phase shift, or phase offset, ($\varphi$) to a cancellation signal output by the PRx filter 48. The amplitude offset (A) and the phase shift ($\varphi$) may, e.g., be dynamically (e.g., adaptively) configured or statically defined.

In operation, a TX signal is provided to the TX port 38 of the duplexer 34. The TX signal is also provided to the PRx filter 48 via the coupler 50. The TX signal leaks from the TX port 38 through the TX filter 36 and the RX filter 42 to the RX port 44 of the duplexer 34. The signal that leaks from the TX port 38 to the RX port 44 is the leakage signal. The PRx filter 48 filters, or processes, the TX signal to thereby generate a cancellation signal having an amplitude and phase variation across the desired cancellation bandwidth that is a function of the amplitude and phase variation of the leakage signal across the desired cancellation bandwidth. In particular, in some embodiments, the PRx filter 48 filters, or processes, the TX signal to thereby generate the cancellation signal such that the cancellation signal has an amplitude and phase variation across the desired cancellation bandwidth that mimics (e.g., is the same as or at least approximately the same as) the amplitude and phase variation of the leakage signal across the desired cancellation bandwidth. The attenuation and phase adjustment circuitry 52 applies the amplitude offset (A) and the phase shift ($\varphi$) to the cancellation signal to thereby provide an adjusted cancellation signal. The amplitude offset (A) and the phase shift ($\varphi$) are selected such that the adjusted cancellation signal is 180° out-of-phase with (or approximately or very near 180° out-of-phase with) the leakage signal and has the same (or approximately the same or very near the same) amplitude. Note that the amplitude offset (A) and the phase shift ($\varphi$) are preferably selected such that the phase offset between the adjusted cancellation signal and the leakage is as close to 180° as possible in the particular implementation and that the amplitude of the adjusted cancellation signal is as close as possible to that of the leakage signal in the particular implementation.

Figure 6:
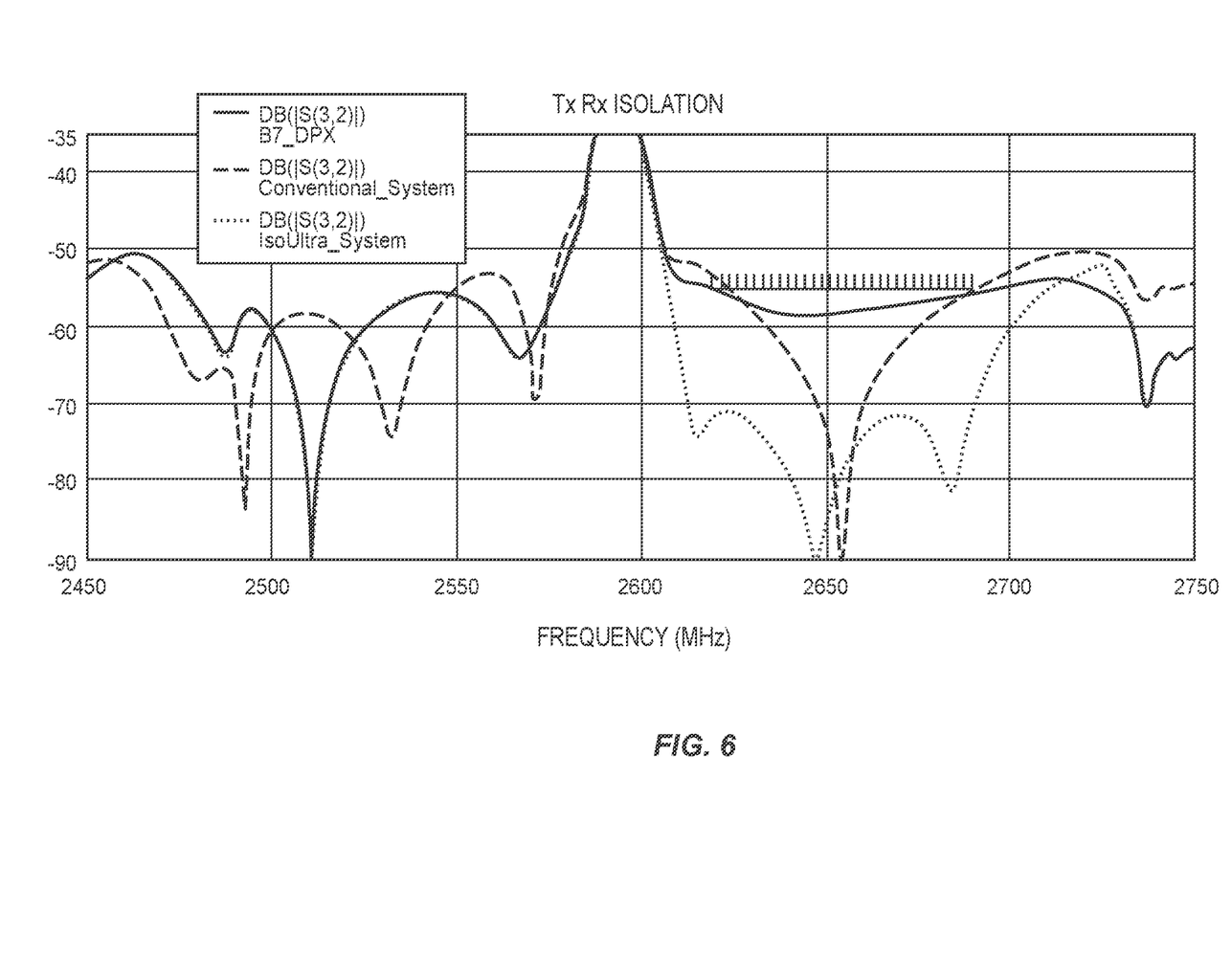
FIG. 6 illustrates simulation results for TX to RX port isolation for one example implementation of the system of FIG. 5.
Figure 7:
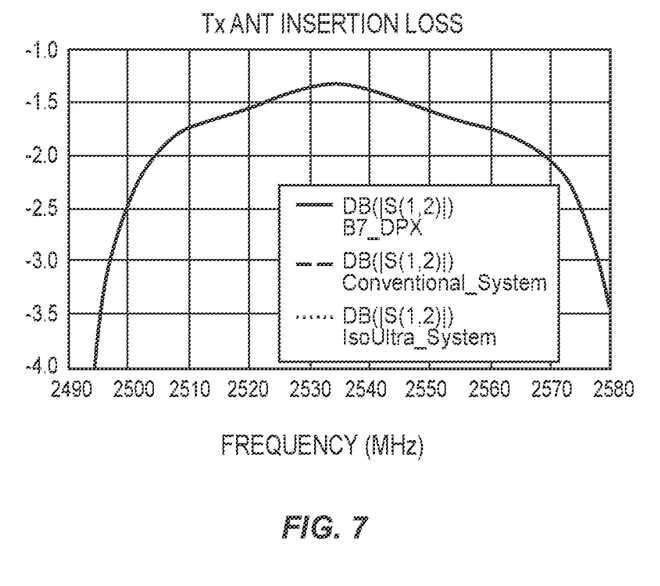
FIG. 7 illustrates simulation results for insertion loss in the TX band for one example implementation of the system of FIG. 5.

FIG. 6 illustrates simulation results for TX/RX isolation for one example implementation of the system 32 of FIG. 5. As illustrated, in the RX band (which in this example is the frequency band centered at 2,678 MHz), the leakage cancellation subsystem 46 provides attenuation of the leakage signal across the entire RX band, rather than only in a narrowband notch (as shown for the conventional leakage cancellation system). Thus, cancellation conditions can be met across at least the same bandwidth as the RX filter 42 and can be met with one A, $\varphi$ setting. Further, with respect to the TX band (which in this example is the frequency band centered at 2,565 MHz), FIG. 6 shows that the leakage cancellation subsystem 46 has no effect on isolation in the TX band. Also, as shown in FIG. 7, the leakage cancellation subsystem 46 has no effect on insertion loss in the TX band.

Figure 8:
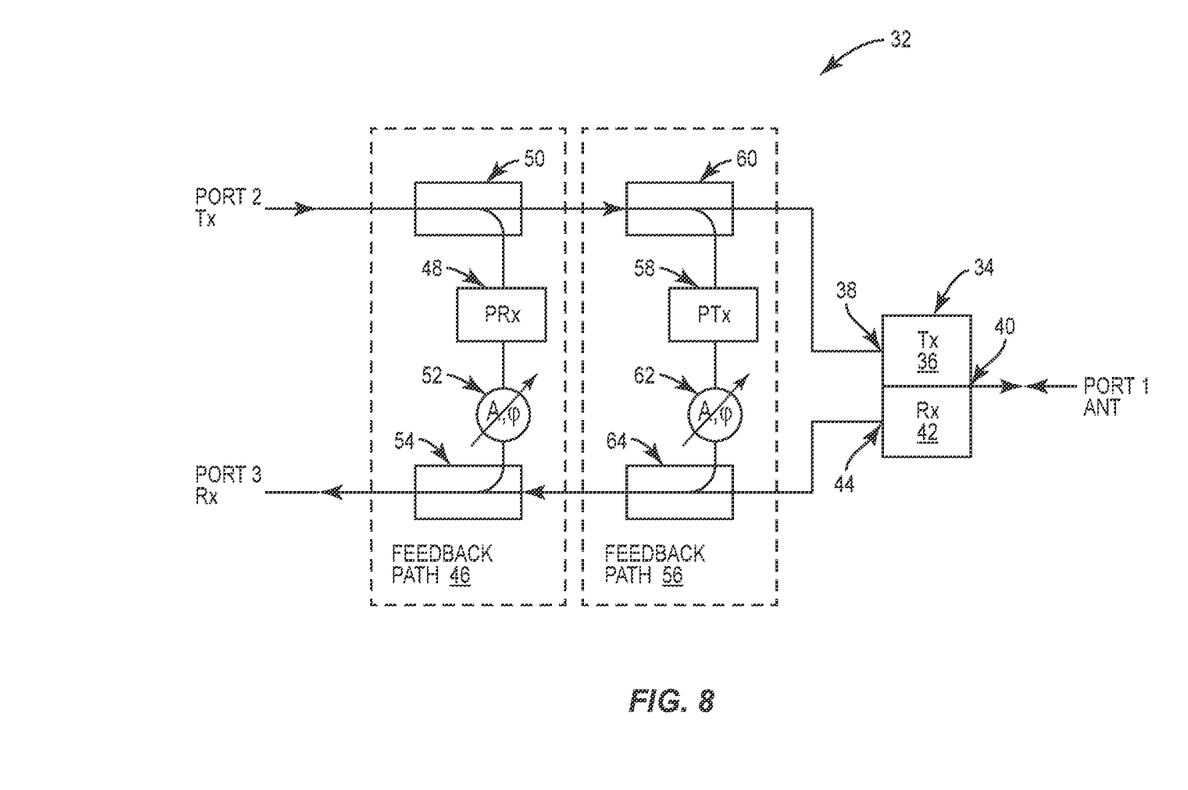
FIGS. 8-10 illustrate additional example embodiments of a system providing improved TX to RX port isolation by compensating for variation of a leakage signal across a desired cancellation bandwidth.

FIG. 8 illustrates the system 32 according to some other embodiments of the present disclosure. In this embodiment, the system 32 provides improvement of isolation in both the RX and TX bands, and no effect on insertion losses. As illustrated, the system 32 includes, in this example, the duplexer 34, the leakage cancellation subsystem 46 that operates to mitigate leakage in a first desired cancellation band (the RX frequency band in this example), and a second leakage cancellation subsystem 56 that operates to mitigate leakage in a second desired cancellation band (the TX frequency band in this example).

The second leakage cancellation subsystem 56 operates to mitigate, or cancel, a leakage signal in the TX band that passes from the TX port 38 to the RX port 44 of the duplexer 34 in such a manner as to compensate for, or account for, variation of the leakage signal (e.g., variation of amplitude and/or phase of the leakage signal) across the TX band. As illustrated, the second leakage cancellation subsystem 56 includes a Parallel TX (PTx) filter 58, which is also referred to herein as a PTx element, having an input coupled to the TX port 38 of the duplexer 34 via a coupler 60. In some embodiments, the PTx filter 58 includes one or more acoustic elements (e.g., an acoustic filter such as, for example, a BAW filter that includes one or more BAW resonators or a SAW filter that includes one or more SAW resonators). Acoustic elements can follow a fast phase response across the frequency of the filter elements of the duplexer 34. Note that, in some embodiments, elements (e.g., acoustic elements) of the PRx filter 48 and/or the PTx filter 58 can be implemented on the same die (i.e., in a monolithic implementation of the duplexer 34) or on separate dies.

The PTx filter 58 has a custom-shaped phase response in the feedback path. More specifically, in some embodiments, the PTx filter 58 has an amplitude and phase response that mimics that of the leakage path (i.e., the path through which the leakage signal propagates from the TX port 38 to the RX port 44) across the TX band. In this manner, the PTx filter 58 compensates for the variation of the leakage signal across the TX band and, as a result, TX/RX isolation is improved.

The second leakage cancellation subsystem 56 also includes attenuation and phase adjustment circuitry 62 having an input coupled to the output of the PTx filter 58 and an output coupled to the RX port 44 of the duplexer 34 via a coupler 64. The second leakage cancellation subsystem 56 operates to apply an attenuation, or amplitude offset, (A) and a phase shift, or phase offset, ($\varphi$) to a cancellation signal output by the PTx filter 58. The amplitude offset (A) and the phase shift ($\varphi$) may, e.g., be dynamically (e.g., adaptively) configured or statically defined.

In operation, a TX signal is provided to the TX port 38 of the duplexer 34. The TX signal is also provided to the PRx filter 48 via the coupler 50 and provided to the PTx filter 58 via the coupler 60. The leakage cancellation subsystem 46 operates to mitigate, or cancel, the leakage signal within the RX band in such a manner as to account for variation in the amplitude and phase of the leakage signal across the RX band. Likewise, the second leakage cancellation subsystem 56 operates to mitigate, or cancel, the leakage signal within the TX band in such a manner as to account for variation in the amplitude and phase of the leakage signal across the TX band.

More specifically, the TX signal leaks from the TX port 38 through the TX filter 36 and the RX filter 42 to the RX port 44 of the duplexer 34. The signal that leaks from the TX port 38 to the RX port 44 is the leakage signal. The details of the PRx filter 48 and the attenuation and phase adjustment circuitry 52 are described above and, as such, are not repeated. With respect to the second leakage cancellation subsystem 56, the PTx filter 58 filters, or processes, the TX signal to thereby generate a cancellation signal having an amplitude and phase variation across the TX band that is a function of (e.g., mimics, e.g., is the same as or at least approximately the same as) the amplitude and phase variation of the leakage signal across the TX band. The attenuation and phase adjustment circuitry 62 applies the amplitude offset (A) and the phase shift ($\varphi$) to the cancellation signal to thereby provide an adjusted cancellation signal for the TX band. The amplitude offset (A) and the phase shift ($\varphi$) for the TX band are selected such that the adjusted cancellation signal for the TX band is 180° out-of-phase with (or approximately or very near 180° out-of-phase with) the leakage signal for the TX band and has the same (or approximately the same or very near the same) amplitude for the TX band. Note that the amplitude offset (A) and the phase shift ($\varphi$) for the TX band are preferably selected such that the phase offset between the adjusted cancellation signal for the TX band and the leakage signal for the TX band is as close to 180° as possible in the particular implementation and that the amplitude of the adjusted cancellation signal for the TX band is as close as possible to that of the leakage signal for the TX band in the particular implementation.

Figure 9:
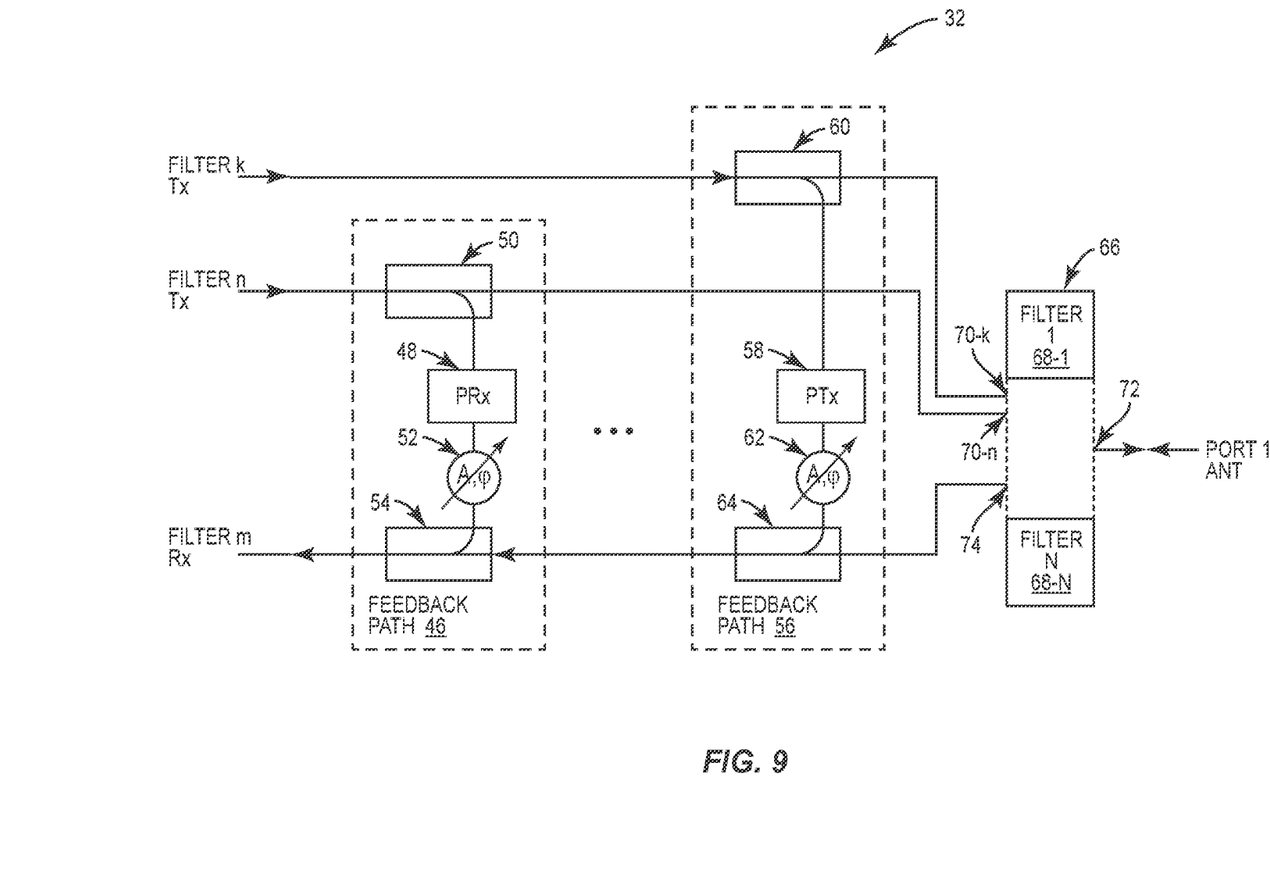

FIG. 9 illustrates an embodiment of the system 32 that is similar to that of FIG. 8 but where the duplexer 34 is replaced with a multiplexer 66. The embodiment of FIG. 9 demonstrates the concept as expanded on the multiplexer 66. As an example, carrier aggregation cross-band isolation could be improved as well, with no fundamental effect on insertion losses (besides coupling traces). As illustrated, the multiplexer 66 includes a number of filters 68-1 through 66-N including, in this example, M TX filters (where M≥2) that couple respective TX ports 70 to an antenna port 72 of the multiplexer 66 and at least one RX filter that each couples the antenna port 72 to a respective RX port 74 of the multiplexer 66. In this example, two TX ports 70-$n$ and 70-$k$ are illustrated. The second leakage cancellation subsystem 46 operates to mitigate a leakage signal (in the RX band) from one TX port 70-$n$ to the RX port 74 taking into account a variation in the amplitude and phase of the leakage signal in the RX band, and the second leakage cancellation subsystem 56 operates to mitigate a leakage signal (in the TX band) from another TX port 70-$k$ to the RX port 74 taking into account the variation in the amplitude and phase of the leakage signal in the TX band.

More specifically, in this example, the input of the PRx filter 48 is coupled to the TX port 70-$n$ of the multiplexer 66 via the coupler 50. The PRx filter 48 has an amplitude and phase response that mimics that of the leakage path (i.e., the path through which the leakage signal propagates from the TX port 70-$n$ to the RX port 74) across the RX band. In this manner, the PRx filter 48 compensates for the variation of the leakage signal from the TX port 70-$n$ to the RX port 74 across the RX band and, as a result, TX/RX isolation is improved. Otherwise, the leakage cancellation subsystem 46 is the same as that described above.

In a similar manner, the input of the PTx filter 58 is coupled to the TX port 70-$k$ of the multiplexer 66 via the coupler 60. The PTx filter 58 has an amplitude and phase response that mimics that of the leakage path (i.e., the path through which the leakage signal propagates from the TX port 70-$k$ to the RX port 74) across the TX band. In this manner, the PTx filter 58 compensates for the variation of the leakage signal from the TX port 70-$k$ to the RX port 74 across the TX band. Otherwise, the second leakage cancellation subsystem 56 is the same as that described above. Note that while only two leakage cancellation subsystems 46 and 56 are illustrated in FIG. 9, the system 32 may include additional leakage cancellation systems.

Figure 10:
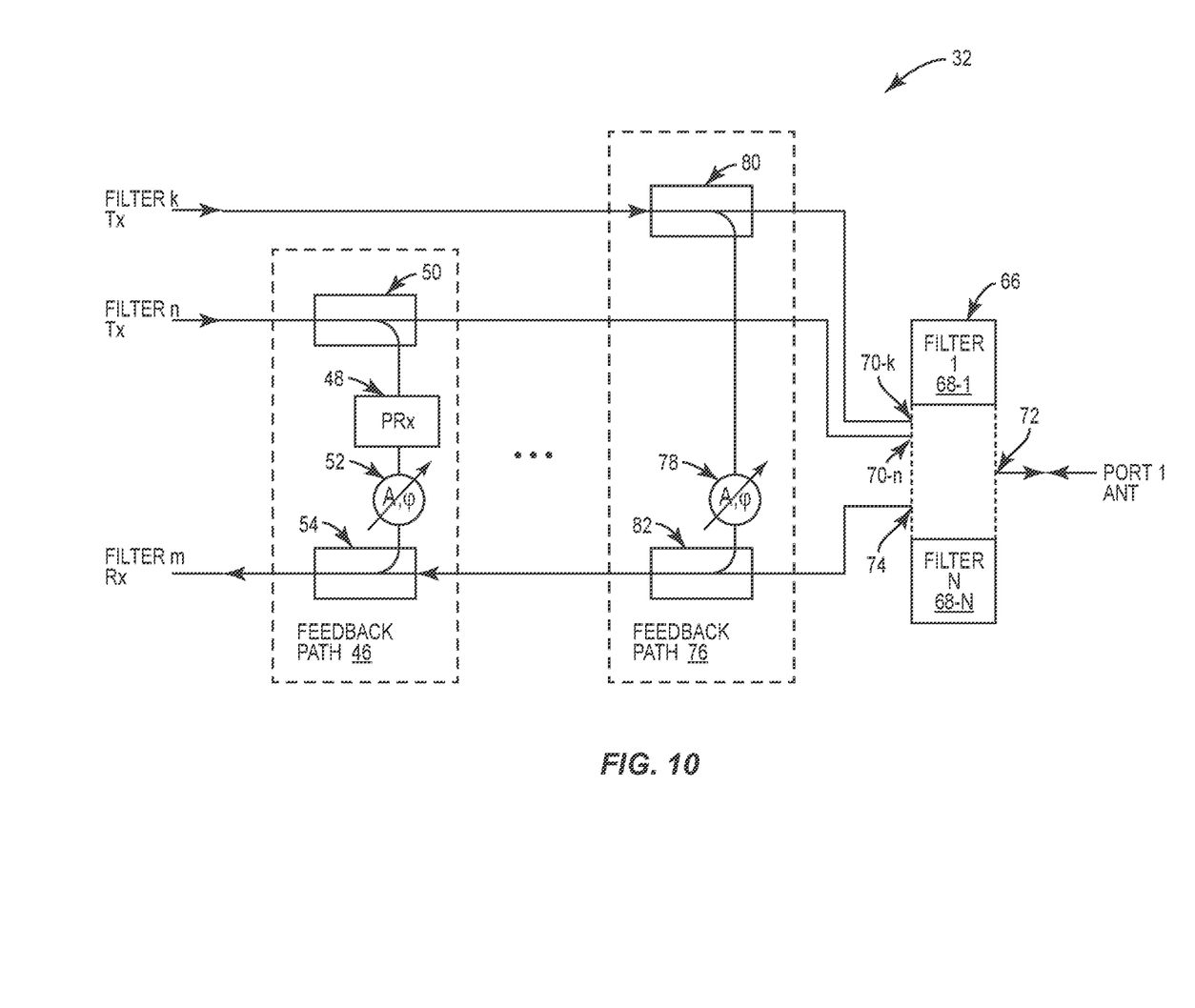

FIG. 10 illustrates an embodiment of the system 32 that is similar to that of FIG. 9 but where the second leakage cancellation subsystem 56 is replaced with a conventional leakage cancellation subsystem 76. This embodiment demonstrates that a combination of the leakage cancellation subsystem 46 disclosed herein and the conventional approach is possible. While only one conventional leakage cancellation subsystem 76 is illustrated, one or more narrow bands could be cancelled out with one or more conventional leakage cancellation subsystems 76. As illustrated and as discussed above, the conventional leakage cancellation subsystem 76 includes attenuation and phase adjustment circuitry 78 having an input coupled to, in this example, the TX port 70-$k$ of the multiplexer 66 via a coupler 80 and an output coupled to the RX port 74 via a coupler 82. As described above, the conventional leakage cancellation subsystem 76 attenuates the leakage signal from the TX port 70-$n$ to the RX port 74 over a narrowband notch in the desired cancellation band (e.g., the TX band).

Figure 11:
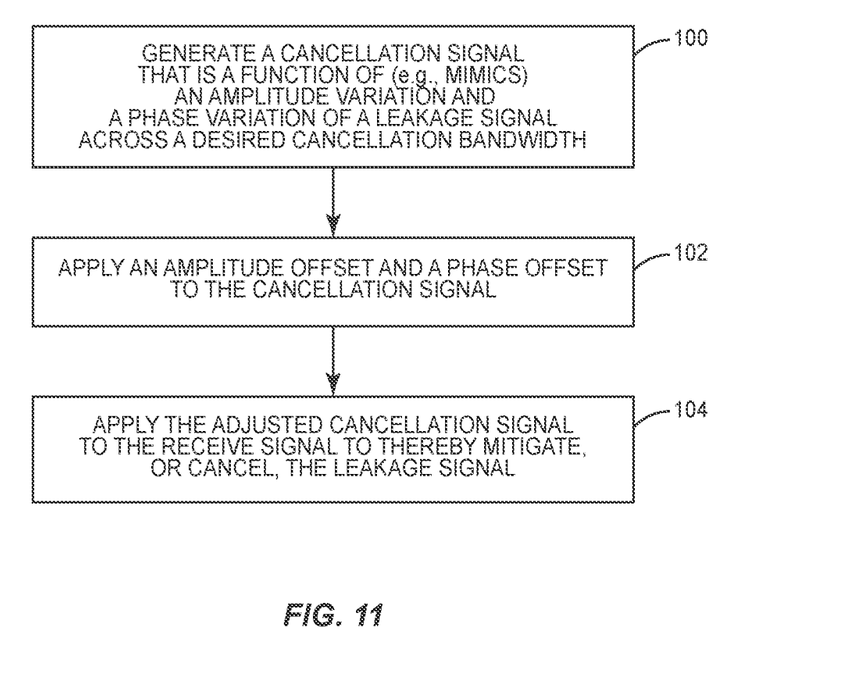
FIG. 11 is a flow chart that illustrates a process for mitigating a leakage signal in a duplexer/multiplexer according to some embodiments of the present disclosure.

FIG. 11 is a flow chart that illustrates a process for mitigating a leakage signal in a duplexer/multiplexer according to some embodiments of the present disclosure. As illustrated, the process includes generating a cancellation signal that is a function of (e.g., mimics) an amplitude variation and a phase variation of a leakage signal from a TX port to a RX port of a duplexer or multiplexer across a desired cancellation bandwidth, as described above (step 100). The method further includes applying an amplitude offset and a phase offset to the cancellation signal to provide an adjusted cancellation signal, as described above (step 102). The adjusted cancellation signal is applied to a RX signal output at the RX port of the duplexer or multiplexer to thereby mitigate the leakage signal, as described above (step 104).

Those skilled in the art will recognize improvements and modifications to the preferred embodiments of the present disclosure. All such improvements and modifications are considered within the scope of the concepts disclosed herein and the claims that follow.

What is claimed is:
1. A system comprising:
a duplexer or multiplexer comprising:
a transmit port;
a receive port;
an antenna port;

a transmit filter that couples the transmit port to the antenna port; and
a receive filter that couples the antenna port to the receive port;
a first leakage cancellation subsystem adapted to cancel a first leakage signal from the transmit port of the duplexer or multiplexer to the receive port of the duplexer or multiplexer across a receive band of the receive filter of the duplexer or multiplexer, the first leakage cancellation subsystem compensating for variation of the first leakage signal across the receive band of the receive filter; and
a second leakage cancellation subsystem adapted to cancel a second leakage signal from the transmit port of the duplexer or multiplexer to the receive port of the duplexer or multiplexer across a transmit band of the transmit filter of the duplexer or multiplexer, the second leakage cancellation subsystem compensating for variation of the second leakage signal across the transmit band.

2. The system of claim 1 wherein the variation of the first leakage signal across the receive band of the receive filter is a variation of both an amplitude and a phase of the first leakage signal over the receive band of the receive filter.

3. The system of claim 1 wherein the first leakage cancellation subsystem comprises filtering circuitry having an input coupled to the transmit port of the duplexer or multiplexer, the filtering circuitry adapted to filter a transmit signal provided to the transmit port of the duplexer or multiplexer to generate a cancellation signal that is a function of an amplitude variation of the first leakage signal across the receive band of the receive filter and a phase variation of the first leakage signal across the receive band of the receive filter.

4. The system of claim 3 wherein the filtering circuitry comprises a plurality of acoustic elements.

5. The system of claim 3 wherein the filtering circuitry comprises a Bulk Acoustic Wave (BAW) filter.

6. The system of claim 3 wherein the filtering circuitry comprises a Surface Acoustic Wave (SAW) filter.

7. The system of claim 3 wherein the first leakage cancellation subsystem further comprises attenuation and phase adjustment circuitry having an input coupled to an output of the filtering circuitry and an output coupled to the receive port of the duplexer or multiplexer, the attenuation and phase adjustment circuitry adapted to apply an amplitude offset and a phase offset to the cancellation signal to thereby provide an adjusted cancellation signal that mitigates the first leakage signal at the receive port of the duplexer or multiplexer.

8. The system of claim 1 wherein the first leakage cancellation subsystem comprises:
filtering circuitry having an input coupled to the transmit port of the duplexer or multiplexer, the filtering circuitry comprising a plurality of acoustic elements and being adapted to filter a transmit signal provided to the transmit port of the duplexer or multiplexer to generate a cancellation signal that is a function of an amplitude variation of the first leakage signal across the receive band of the receive filter and a phase variation of the first leakage signal across the receive band of the receive filter; and
attenuation and phase adjustment circuitry having an input coupled to an output of the filtering circuitry and an output coupled to the receive port of the duplexer or multiplexer, the attenuation and phase adjustment circuitry adapted to apply an amplitude offset and a phase offset to the cancellation signal to thereby provide an adjusted cancellation signal that mitigates the first leakage signal at the receive port of the duplexer or multiplexer.

9. The system of claim 8 wherein the filtering circuitry comprises a Bulk Acoustic Wave (BAW) filter.

10. The system of claim 8 wherein the filtering circuitry comprises a Surface Acoustic Wave (SAW) filter.

11. The system of claim 1 wherein the duplexer or multiplexer is a duplexer.

12. The system of claim 1 wherein the duplexer or multiplexer is a multiplexer.

13. A system comprising:
a multiplexer comprising:
a first transmit port;
a second transmit port;
a receive port;
an antenna port;
a first transmit filter that couples the first transmit port to the antenna port;
a second transmit filter that couples the second transmit port to the antenna port; and
a receive filter that couples the antenna port to the receive port;
a first leakage cancellation subsystem adapted to cancel a first leakage signal from the first transmit port of the multiplexer to the receive port of the multiplexer across a receive band of the receive filter of the multiplexer, the first leakage cancellation subsystem compensating for variation of the first leakage signal across the receive band of the receive filter; and
a second leakage cancellation subsystem adapted to cancel a second leakage signal from the second transmit port of the multiplexer to the receive port of the multiplexer across a transmit band of the second transmit filter of the multiplexer, the second leakage cancellation subsystem compensating for variation of the second leakage signal across the transmit band of the second transmit filter.

14. The system of claim 13 wherein the first leakage cancellation subsystem comprises:
filtering circuitry having an input coupled to the first transmit port of the multiplexer, the filtering circuitry comprising a plurality of acoustic elements and being adapted to filter a transmit signal provided to the first transmit port of the multiplexer to generate a cancellation signal that is a function of an amplitude variation of the first leakage signal across the receive band of the receive filter and a phase variation of the first leakage signal across the receive band of the receive filter; and
attenuation and phase adjustment circuitry having an input coupled to an output of the filtering circuitry and an output coupled to the receive port of the duplexer or multiplexer, the attenuation and phase adjustment circuitry adapted to apply an amplitude offset and a phase offset to the cancellation signal to thereby provide an adjusted cancellation signal that mitigates the first leakage signal at the receive port of the multiplexer.

15. The system of claim 14 wherein the second leakage cancellation subsystem comprises second filtering circuitry having an input coupled to the second transmit port of the multiplexer, the second filtering circuitry comprising a plurality of acoustic elements and being adapted to filter a second transmit signal provided to the second transmit port of the multiplexer to generate a cancellation signal that is a function of an amplitude variation of the second leakage signal across the second transmit band of the second transmit filter and a phase variation of the second leakage signal across the desired cancellation bandwidth.

16. A system comprising:
a multiplexer comprising:
a first transmit port;
a second transmit port;
a receive port;
an antenna port;
a first transmit filter that couples the first transmit port to the antenna port;
a second transmit filter that couples the second transmit port to the antenna port; and
a receive filter that couples the antenna port to the receive port;
a first leakage cancellation subsystem adapted to cancel a first leakage signal from the first transmit port of the multiplexer to the receive port of the duplexer or multiplexer across a receive band of the receive filter of the multiplexer, the first leakage cancellation subsystem compensating for variation of the first leakage signal across the receive band of the receive filter; and
a second leakage cancellation subsystem comprising attenuation and phase adjustment circuitry having an input coupled to the second transmit port and an output coupled to the receive port.

17. The system of claim 16 wherein the attenuation and phase adjustment circuitry is adapted to apply an amplitude offset and a phase offset to a transmit signal provided to the second transmit port of the multiplexer to thereby provide a cancellation signal that mitigates a second leakage signal from the second transmit port to the receive port of the multiplexer.

18. The system of claim 16 wherein the second leakage cancellation subsystem comprises filtering circuitry having an input coupled to the second transmit port of the multiplexer, the filtering circuitry adapted to filter the transmit signal provided to the second transmit port of the multiplexer to generate a cancellation signal that is a function of an amplitude variation of the second leakage signal across a desired cancellation bandwidth and a phase variation of the second leakage signal across the desired cancellation bandwidth.

19. The system of claim 18 wherein the filtering circuitry comprises a Bulk Acoustic Wave (BAW) filter.

20. The system of claim 18 wherein the filtering circuitry comprises a Surface Acoustic Wave (SAW) filter.

* * * * *

UNITED STATES PATENT AND TRADEMARK OFFICE
CERTIFICATE OF CORRECTION

PATENT NO. : 10,097,230 B2
APPLICATION NO. : 15/139775
DATED : October 9, 2018
INVENTOR(S) : Gernot Fattinger Page 1 of 1

It is certified that error appears in the above-identified patent and that said Letters Patent is hereby corrected as shown below:

In the Claims

In Column 11, Line 1, replace "a transmit filler" with --a transmit filter--.

In Column 11, Line 16, replace "a transmit hand" with --a transmit band--.

Signed and Sealed this
Eleventh Day of December, 2018

Andrei Iancu
*Director of the United States Patent and Trademark Office*